United States Patent
Kim et al.

(10) Patent No.: US 10,003,096 B2
(45) Date of Patent: Jun. 19, 2018

(54) POLYMER ELECTROLYTE MEMBRANE, MEMBRANE-ELECTRODE ASSEMBLY COMPRISING THE SAME AND FUEL CELL COMPRISING THE SAME

(71) Applicant: KOLON INDUSTRIES, INC., Gwacheon-si, Gyeonggi-do (KR)

(72) Inventors: Na Young Kim, Yongin-si (KR); Moo Seok Lee, Yongin-si (KR); Dong Hoon Lee, Yongin-si (KR); Yong Cheol Shin, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 91 days.

(21) Appl. No.: 15/127,825

(22) PCT Filed: Mar. 25, 2015

(86) PCT No.: PCT/KR2015/002932
§ 371 (c)(1),
(2) Date: Sep. 21, 2016

(87) PCT Pub. No.: WO2015/147550
PCT Pub. Date: Oct. 1, 2015

(65) Prior Publication Data
US 2017/0098845 A1    Apr. 6, 2017

(30) Foreign Application Priority Data
Mar. 28, 2014 (KR) .................. 10-2014-0036467

(51) Int. Cl.
*H01M 8/1032* (2016.01)
*H01M 8/1027* (2016.01)
(Continued)

(52) U.S. Cl.
CPC ....... *H01M 8/1032* (2013.01); *H01M 8/1027* (2013.01); *C08L 79/04* (2013.01);
(Continued)

(58) Field of Classification Search
CPC ............. H01M 8/1032; H01M 8/1027; H01M 8/1025; H01M 2008/1095; H01M 2300/0082; C08L 79/04
See application file for complete search history.

(56) References Cited

U.S. PATENT DOCUMENTS

2002/0091225 A1* 7/2002 McGrath .............. B01D 69/141
528/170
2006/0166048 A1* 7/2006 Sakaguchi ......... B01D 67/0093
429/483
(Continued)

FOREIGN PATENT DOCUMENTS

CN      102643421 A      8/2012
CN      103059300    *   4/2013
(Continued)

OTHER PUBLICATIONS

KR20060083374MT.*
(Continued)

Primary Examiner — Alex Usyatinsky
(74) Attorney, Agent, or Firm — Sughrue Mion, PLLC (57) ABSTRACT

The present invention relates to a polymer electrolyte membrane, and a membrane-electrode assembly and a fuel cell containing the same, and the polymer electrolyte membrane comprises a polymer comprising repeating units represented by the following chemical formulas 1-3. Chemical formulas 1-3 are as defined in the specification. The polymer electrolyte membrane has excellent resistance to radical attack and has improved acid-base interaction, thereby maximizing the function of an ion conductive group, and thus can
(Continued)

improve the operation performance of a fuel cell in a low humidification state.

12 Claims, 1 Drawing Sheet

(51) Int. Cl.
  *H01M 8/1025* (2016.01)
  *H01M 8/1018* (2016.01)
  *C08L 79/04* (2006.01)

(52) U.S. Cl.
  CPC .. *H01M 8/1025* (2013.01); *H01M 2008/1095* (2013.01); *H01M 2300/0082* (2013.01)

(56) References Cited

U.S. PATENT DOCUMENTS

| | | | | |
|---|---|---|---|---|
| 2009/0117440 | A1* | 5/2009 | Choi | C07D 413/04 429/500 |
| 2010/0152308 | A1* | 6/2010 | Kadota | C08G 61/10 521/25 |
| 2011/0166241 | A1* | 7/2011 | Choi | C08G 61/12 521/27 |
| 2013/0245207 | A1* | 9/2013 | Choi | C08G 61/12 525/471 |

FOREIGN PATENT DOCUMENTS

| | | |
|---|---|---|
| CN | 103059300 A | 4/2013 |
| CN | 103467396 A | 12/2013 |
| JP | 2010-189503 A | 9/2010 |
| JP | 4590824 B2 | 12/2010 |
| JP | 5350974 B2 | 11/2013 |
| KR | 10-2006-0083372 A | 7/2006 |
| KR | 10-2006-0083374 A | 7/2006 |
| KR | 20060083374 * | 7/2006 |
| KR | 10-2009-0088646 A | 8/2009 |
| KR | 1020090088646 * | 8/2009 |
| KR | 10-2010-0021468 A | 2/2010 |
| KR | 10-2010-0050423 A | 5/2010 |
| KR | 10-1004680 B1 | 1/2011 |
| KR | 2015/002932 A | 6/2015 |

OTHER PUBLICATIONS

Decision_to_Grant_a_Patent issued by JPO dated Aug. 22, 2017.*
KR20090088646MT.*
CN1862858-Abstract.*
CN101679615-Abstract.*
European Patent Office; Communication dated Aug. 28, 2017 in counterpart application No. 15768211.3 (received by Applicant on Sep. 8, 2017).
Einsla et al., "Sulfonated Poly(Arylene Ether Benzimidazole) Copolymers for Proton Exchange Membrane Fuel Cells," The Electrochemical Society, Inc., 206th Meeting, 2004. (1 page total).
Ko et al., "Synthesis and Characterization of Intermolecular Ionic Cross-Linked Sulfonated Poly(Arylene Ether Sulfone)s for Direct Methanol Fuel Cells," Journal of Membrane Science, vol. 390-391, 2012, pp. 226-234.
Bae et al., "Synthesis and Properties of Sulfonated Poly(Arylene Ether)s Containing Azole Groups," Journal of Polymer Science Part A: Polymer Chemistry, vol. 49, DOI 10.1002, 2011, pp. 3863-3873.
International Searching Authority, International Search Report for PCT/KR2015/002932 dated Jun. 26, 2015.
State Intellectual Property Office of People's Republic of China, communication dated Mar. 16, 2018 in counterpart application No. 201580014087.0.

* cited by examiner

POLYMER ELECTROLYTE MEMBRANE, MEMBRANE-ELECTRODE ASSEMBLY COMPRISING THE SAME AND FUEL CELL COMPRISING THE SAME

CROSS REFERENCE TO RELATED APPLICATIONS

This application is a National Stage of International Application No. PCT/KR2015/002932 filed Mar. 25, 2015, claiming priority based on Korean Patent Application No. 10-2014-0036467 filed Mar. 28, 2014, the contents of all of which are incorporated herein by reference in their entirety.

TECHNICAL FIELD

The present invention relates to a polymer electrolyte membrane, a membrane-electrode assembly including the same and a fuel cell including the same. More particularly, the present invention relates to a polymer electrolyte membrane which can prevent a phenomenon in which an addition reaction occurs on an aromatic ring of the polymer electrolyte membrane or the aromatic ring is broken by attack from radicals formed on a cathode during operation of a fuel cell, based on improved resistance to radical attacks, and can maximize functions of an ionic conductive group and thus enhance fuel cell operation functions under low-humidity conditions based on improved acid-base interaction, a membrane-electrode assembly including the same and a fuel cell including the same.

BACKGROUND ART

A fuel cell, which is a cell that directly converts chemical energy generated by oxidation of a fuel into electrical energy, attracts much attention as a next-generation energy source owing to high energy efficiency and high eco-friendliness based on less contaminant exhaust.

In general, the fuel cell has a structure in which an oxidation electrode (anode) and a reduction electrode (cathode) are opposite to each other via an electrolyte membrane and such a structure is referred to as a "membrane electrode assembly (MEA)".

Depending on the type of electrolyte membrane, the fuel cell is classified into an alkaline electrolyte fuel cell, a direct oxidation fuel cell, a polymer electrolyte membrane fuel cell (PEMFC) and the like. Among them, the polymer electrolyte fuel cell comes into the spotlight for portable, vehicle and household power generation applications due to advantages such as low operation temperature of less than 100° C., rapid starting and response speeds and excellent durability.

Representative examples of the polymer electrolyte fuel cell include a proton exchange membrane fuel cell (PEMFC) using a hydrogen gas as a fuel, and the like.

An overall reaction occurring in the polymer electrolyte fuel cell will be described in brief. First, when a fuel such as hydrogen gas is fed to the anode, hydrogen is oxidized at the anode to produce a hydrogen ion ($H^+$) and an electron ($e^-$). The produced hydrogen ion ($H^+$) is transferred to the cathode via the polymer electrolyte membrane, whereas the produced electron ($e^-$) is transferred to the cathode via an exterior circuit. When oxygen is fed to the cathode, the oxygen is bonded to the hydrogen ion ($H^+$) and electron ($e^-$), and is thus reduced, to produce water.

The polymer electrolyte membrane serves as a channel, transferring the hydrogen ion ($H^+$) produced at the anode to the cathode and should be basically capable of conducting hydrogen ions ($H^+$) well. In addition, the polymer electrolyte membrane should be efficiently capable of separating the hydrogen gas fed to the anode from the oxygen fed to the cathode, and requires excellent mechanical strength, dimensional stability and chemical resistance, as well as low ohmic loss at a high current density.

The currently used polymer electrolyte membrane includes a fluoride-based resin, more specifically, a perfluorosulfonic acid resin (hereinafter, referred to as "fluoride ion conductor"). However, the fluoride ion conductor has a problem in which pinholes are generated due to weak mechanical strength when used for a long time and energy conversion efficiency is thus deteriorated. In an attempt to reinforce mechanical strength, the thickness of fluoride ion conductor was increased. In this case, however, there are problems in which ohmic loss is increased, use of expensive materials is also increased and economic efficiency is thus deteriorated.

In order to solve these drawbacks of the fluoride ion conductor, recently, hydrocarbon-based ion conductors are actively developed. However, because the polymer electrolyte membrane repeatedly expands and contracts under humid/dry conditions which are operation conditions of the fuel cell, the hydrocarbon-based polymer electrolyte membrane structurally having a high moisture content has drawbacks of low long-term durability due to low dimensional stability and tensile strength.

To solve these drawbacks, a reinforcement membrane-type polymer electrolyte membrane which exhibits improved mechanical strength by introducing a support as a reinforcing material into the hydrocarbon-based ion conductor was suggested. The support is generally based on a hydrophobic hydrocarbon-based polymer having no ion conductivity. Due to the hydrophobic support, dimensional stability is enhanced, and as a result, mechanical properties such as tensile strength can be secured upon impregnation, and the membrane thickness to minimize membrane resistance and enhance functions can be minimized.

Meanwhile, in order to produce the hydrocarbon-based ion conductor in the form of a reinforcement membrane, the hydrocarbon-based ion conductor is dissolved in a solvent to prepare an impregnation solution, and the porous support is then immersed in the impregnation solution for a predetermined time, or the impregnation solution is applied to the surface of the porous support. However, in this case, due to low impregnability of the support, or deteriorated affinity between the hydrocarbon-based ion conductor and the porous support in the process of removing the solvent by evaporation after the impregnation or application, the porous support may have defects such as cavities. The corresponding membrane part is pressed due to the cavities and as a result, crack and membrane-electrode separation occur. For this reason, the impregnation or application should be inevitably repeated. This causes an increased and non-uniform thickness of the polymer electrolyte membrane.

In addition, when a support with a low porosity is used, cell performance is disadvantageously deteriorated because the support acts as resistance. In response to this problem, a reinforcement membrane having a porous support with maximized porosity was suggested. However, this reinforcement membrane exhibits poorer performance under low humidity conditions (less than 60%) than under high humidity conditions (60 to 100%), in spite of excellent performance and physical properties.

PRIOR ART DOCUMENT

Patent Document (Patent Document 1) Korean Patent Laid-open Publication No. 2006-0083374 (published on: 2006 Jul. 20)
(Patent Document 2) Korean Patent Laid-open Publication No. 2006-0083372 (published on: 2006 Jul. 20)
(Patent Document 3) Korean Patent Laid-open Publication No. 2011-0120185 (published on: 2011 Nov. 3)

DISCLOSURE

Technical Problem

Therefore, it is one object of the present invention to provide a polymer electrolyte membrane which can maximize functions of an ionic conductive group and thus enhance fuel cell operation functions under low-humidity conditions, based on improved resistance to radical attacks and enhanced acid-base interaction.

It is another object of the present invention to provide a membrane-electrode assembly including the polymer electrolyte membrane.

It is another object of the present invention to provide a fuel cell including the polymer electrolyte membrane.

Technical Solution

In accordance with an aspect of the present invention, the above and other objects can be accomplished by the provision of a polymer electrolyte membrane including a polymer including repeat units represented by Formulae 1 to 3 below:

[Formula 1]

[Formula 2]

*—[—Y—Z—]—*  [Formula 3]

wherein A is an ion conducting group selected from the group consisting of a sulfonic acid group, a carboxylic acid group and a phosphoric acid group;

X is any one selected from the group consisting of a single bond, —CO—, —SO$_2$—, —CONH—, —COO—, —CR'$_2$—, a cyclohexylidene group, a fluorenylidene group, —O— and —S— in which R' is any one selected from the group consisting of a hydrogen atom, a halogen atom, an alkyl group, a halogenated alkyl group, an allyl group, an aryl group, a nitro group and a nitrile group;

Y is a bivalent nitrogen-containing aromatic ring;

Z is —O— or —S—;

$R_1$ to $R_{14}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group; and N is an integer of 0 to 4.

The polymer may include 100 parts by mole of the repeat unit represented by Formula 3, 1 to 200 parts by mole of the repeat unit represented by Formula 1 and 1 to 200 parts by mole of the repeat unit represented by Formula 2.

The bivalent nitrogen-containing aromatic ring may include any one selected from the group consisting of pyrrole, triazole, isothiazole, oxazole, iso-oxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The polymer may further include a repeat unit represented by Formula 4 below:

[Formula 4]

wherein Z is —O— or —S—; and $R_{15}$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

The polymer may include 100 parts by moles of the repeat unit represented by Formula 3, 1 to 200 parts by mole of the repeat unit represented by Formula 1, 1 to 200 parts by mole of the repeat unit represented by Formula 2, and 1 to 200 parts by mole of the repeat unit represented by Formula 4.

The polymer may further include repeat units represented by Formulae 5 and 6 below:

[Formula 5]

[Formula 6]

wherein A is an ion conducting group selected from the group consisting of a sulfonic acid group, a carboxylic acid group and a phosphoric acid group;

Y is a bivalent nitrogen-containing aromatic ring;

Z is —O— or —S—; and

$R_1$ to $R_6$ and $R_{15}$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

The polymer may further include repeat units represented by Formulae 7 and 8 below:

[Formula 7]

[Formula 8]

wherein A is an ion conducting group selected from the group consisting of a sulfonic acid group, a carboxylic acid group and a phosphoric acid group;

X is any one selected from the group consisting of a single bond, —CO—, —SO$_2$—, —CONH—, —COO—, —CR'$_2$—, a cyclohexylidene group, a fluorenylidene group, —O— and —S— in which R' is any one selected from the group consisting of a hydrogen atom, a halogen atom, an alkyl group, a halogenated alkyl group, an allyl group, an aryl group, a nitro group and a nitrile group;

Z is —O— or —S—;

$R_1$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group; and N is an integer of 0 to 4.

The polymer electrolyte membrane may include a porous support including nanofibers integrated in the form of a non-woven fabric including a plurality of pores, and the polymer filling pores of the porous support.

In another aspect of the present invention, provided is a membrane-electrode assembly including an anode and a cathode which face each other, and the polymer electrolyte membrane disposed between the anode and the cathode.

In another aspect of the present invention, provided is a fuel cell including the membrane-electrode assembly.

Effects of the Invention

The polymer electrolyte membrane of the present invention can prevent a phenomenon in which an addition reaction occurs on an aromatic ring of the polymer electrolyte membrane or the aromatic ring is broken by attack from radicals formed on a cathode during operation of a fuel cell, based on improved resistance to radical attacks, and can maximize functions of an ionic conductive group and thus enhance fuel cell operation functions under low-humidity conditions based on improved acid-base interaction.

DESCRIPTION OF DRAWINGS

The above and other objects, features and other advantages of the present invention will be more clearly understood from the following detailed description taken in conjunction with the accompanying drawings, in which.

BEST MODE

Hereinafter, embodiments according to the present invention will be described in detail to such an extent that a person having ordinary knowledge in the art field to which the invention pertains can easily carry out the invention. However, the present invention can be realized in various forms and is not limited to embodiments stated herein.

As used herein, the term "nano" means a nano-scale and covers a size of 1 μm or less.

As used herein, the term "diameter" means a length of a short axis passing through the center of a fiber and the term "length" means a length of a long axis passing through the center of the fiber.

Unless otherwise specified herein, an alkyl group include a primary alkyl group, a secondary alkyl group and a tertiary alkyl group.

Unless otherwise specified herein, an alkyl group means a linear or branched alkyl group having 1 to 10 carbon atoms, a halogenated alkyl group means a linear or branched halogenated alkyl group having 1 to 10 carbon atoms, an allyl group means an allyl group having 2 to 10 carbon atoms, and an aryl group means an aryl group having 6 to 30 carbon atoms.

Unless otherwise specified herein, all compounds or substituents may be substituted or unsubstituted. As used herein, the term "substituted" means that a hydrogen is replaced by any one selected from the group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof, and combinations thereof.

The symbol "*" on both ends of a formula in this specification means the formula is connected to adjacent another formula.

The polymer electrolyte membrane according to an embodiment of the present invention includes a polymer including repeat units represented by the following Formulae 1 to 3. The polymer includes a nitrogen-containing aromatic ring in a main chain, thus improving resistance to radical attacks and acid-base interaction. Accordingly, the polymer electrolyte membrane can prevent a phenomenon in which an addition reaction occurs on an aromatic ring of the polymer electrolyte membrane or the aromatic ring is broken by attack from radicals formed on a cathode during operation of a fuel cell and can maximize functions of an ionic conductive group and thus enhance fuel cell operation functions under low-humidity conditions.

[Formula 1]

[Formula 2]

*―(―Y―Z―)―*     [Formula 3]

In Formulae 1 to 3, A represents an ion conducting group. The ion conducting group includes any one selected from the group consisting of a sulfonic acid group, a carboxylic acid group and a phosphoric acid group, and is preferably a sulfonic acid group.

Z represents —O— or —S— and is preferably —O—.

X represents any one selected from the group consisting of a single bond, —CO—, —CONH—, —COO—, —SO$_2$—/CR'$_2$—, a cyclohexylidene group, a fluorenylidene group, —O— and —S—, wherein R' represents any one selected from the group consisting of a hydrogen atom, a halogen atom, an alkyl group, a halogenated alkyl group, an allyl group, an aryl group, a nitro group and a nitrile group. In a case in which X is a single bond, a phenyl group at opposite sides of X is directly bonded and a representative example of the phenyl group includes a biphenyl group.

$R_1$ to $R_{14}$ each independently represent any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

The halogen atom includes any one selected from the group consisting of bromine, fluorine and chlorine, the alkyl group may be a methyl group, an ethyl group, a propyl group, a butyl group, an isobutyl group, an amyl group, a hexyl group, a cyclohexyl group, an octyl group or the like, the halogenated alkyl group may be a trifluoromethyl group, a pentafluoroethyl group, a perfluoropropyl group, a perfluorobutyl group, a perfluoropentyl group, a perfluorohexyl group or the like, the allyl group may be a propenyl group or the like, and the aryl group may be a phenyl group, a pentafluorophenyl group or the like. The perfluoroalkyl group means an alkyl group in which a part or entirety of hydrogen atoms is substituted by fluorine.

N is an integer of 0 to 4 and is preferably an integer of 0 or 1.

Y represents a bivalent nitrogen-containing aromatic ring. The nitrogen-containing aromatic ring means an aromatic ring that includes at least one nitrogen atom as a heteroatom. In addition, the nitrogen-containing aromatic ring may include an oxygen atom, a sulfur atom or the like as another heteroatom, in addition to a nitrogen atom.

Specifically, the bivalent nitrogen-containing aromatic ring may be any one selected from the group consisting of pyrrole, triazole, isothiazole, oxazole, iso-oxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The polymer may include 100 parts by mole of the repeat unit represented by Formula 3, 1 to 200 parts by mole of the repeat unit represented by Formula 1 and 1 to 200 parts by mole of the repeat unit represented by Formula 2, and is preferably 100 parts by mole of the repeat unit represented by Formula 3, 30 to 70 parts by mole of the repeat unit represented by Formula 1 and 30 to 70 parts by mole of the repeat unit represented by Formula 2. When the content of the repeat unit represented by Formula 2, with respect to 100 parts by mole of the repeat unit represented by Formula 3 does not fall within the range defined above, swelling of the polymer electrolyte membrane is maximized upon impregnation, mechanical properties are deteriorated and long-term durability is deteriorated, and when the content of the repeat unit represented by Formula 1, with respect to 100 parts by mole of the repeat unit represented by Formula 3 does not fall within the range defined above, the polymer electrolyte membrane may not function as an electrolyte membrane for fuel cells due to low ion conductivity or cell performance thereof.

The polymer may further include a repeat unit represented by Formula 4 below. In this case, in the repeat unit represented by Formula 2, X may not be —SO$_2$—.

[Formula 4]

In Formula 4 above, Z represents —O— or —S—, and $R_{15}$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

When the polymer further includes the repeat unit represented by Formula 4, it may include 100 parts by mole of the compound represented by Formula 3, 1 to 200 parts by mole of the repeat unit represented by Formula 1, 1 to 200 parts by mole of the repeat unit represented by Formula 2, and 1 to 200 parts by mole of the repeat unit represented by Formula 4, and preferably may include 100 parts by mole of the compound represented by Formula 3, 50 to 150 parts by mole of the repeat unit represented by Formula 1, 50 to 150 parts by mole of the repeat unit represented by Formula 2, and 50 to 150 parts by mole of the repeat unit represented by Formula 4. When the content of the repeat unit represented by Formula 4, with respect to 100 parts by mole of the repeat unit represented by Formula 3, does not fall within the range defined above, ion conductivity or cell performance of the polymer electrolyte membrane may be deteriorated.

The polymer may more specifically include repeat units represented by Formulae 5 and 6 below. That is, the polymer has a structure in which the repeat unit represented by Formula 3 is linked to each of the repeat units represented by Formulae 1 and 4. In this case, the repeat unit represented by Formula 1 is not directly linked to the repeat unit represented by Formula 4.

[Formula 5]

[Formula 6]

In Formulae 5 and 6, A, Y, Z, $R_1$ to $R_6$ and $R_{15}$ to $R_{22}$ are defined as above.

When the polymer includes the repeat units represented by Formulae 5 and 6, the polymer may be a random copolymer in which the repeat units represented by Formulae 5 and 6 are randomly linked to one another, or a block copolymer including a first block in which the repeat units represented by Formula 5 are linked to one another and a second block in which the repeat units represented by Formula 6 are linked to one another.

In addition, the polymer may further include repeat units represented by Formulae 7 and 8 below, in addition to the repeat units represented by Formulae 5 and 6.

[Formula 7]

[Formula 8]

In Formulae 7 and 8, A, X, Z, and $R_1$ to $R_{22}$ are defined as above, except that X may not be —$SO_2$—.

The polymer may be polymerized by nucleophilic aromatic substitution between an active dihalide monomer of the repeat unit represented by Formula 1 or Formula 2 and a dihydroxide monomer of the repeat unit represented by Formula 3, or by nucleophilic aromatic substitution between a dihydroxide monomer of the repeat unit represented by the Formula 1 or Formula 2 and an active dihalide monomer of the repeat unit represented by Formula 3.

For example, the active dihalide monomer of the repeat unit represented by Formula 1 below may be sulfonated dichlorodiphenyl sulfone (SDCDPS) or sulfonated difluorodiphenyl sulfone (SDFDPS), the active dihalide monomer of the repeat unit represented by Formula 4 may be dichlorodiphenyl sulfone (DCDPS) or difluorodiphenyl sulfone (DFDPS), and the dihydroxide monomer of the repeat unit represented by Formula 3 may be a nitrogen-containing aromatic ring compound including two —OH groups.

In this case, the polymerization is preferably carried out in the presence of an alkaline compound. The alkaline compound may be specifically sodium hydroxide, potassium hydroxide, sodium carbonate, potassium carbonate, sodium hydrogen carbonate or the like. These compounds may be used singly or as a mixture thereof.

In addition, the polymerization may be carried out in the presence of a solvent. In this case, specifically, examples of the solvent include aprotic polar solvents such as N,N-dimethyl acetamide, N,N-dimethyl formamide, N-methyl-2-pyrrolidone, dimethyl sulfoxide, sulfolane, and 1,3-dimethyl-2-imidazolidinone. These solvents may be used singly or as a mixture thereof.

Although the ion conducting group of the repeat unit represented by Formula 1 is introduced by polymerizing a monomer including the ion conducting group, as described above, the present invention is not limited thereto. For example, an ion conducting group may be introduced into the repeat unit represented by Formula 1 by preparing a polymer from a monomer not including the ion conducting group and then sulfonating using a sulfonating agent.

When the polymer includes a sulfonic acid group as the ion conducting group, the polymer may have a sulfonation degree of 1 to 40 mol %, preferably 5 to 40 mol %. When the polymer has a sulfonation degree within the range defined above, it can exhibit excellent ion conductivity without deterioration in dimensional stability.

Meanwhile, the polymer electrolyte membrane may include a porous support in which nanofibers are integrated in the form of a non-woven fabric including a plurality of pores, and the polymer filling the pores of the porous support.

In the polymer electrolyte membrane, the porous support functions to enhance mechanical strength of the polymer electrolyte membrane and inhibit volume expansion by water, thereby improving dimensional stability.

In addition, in order for the porous support, which is produced from nanofibers having an optimal diameter, to have an optimal porosity and thickness, to be easily produced and to exhibit superior physical properties even after impregnation, the polymer preferably has a weight average molecular weight of 30,000 to 500,000 g/mol. When the weight average molecular weight of the polymer is less than 30,000 g/mol, the porosity and thickness of the porous support can be easily controlled, but porosity and physical properties may be deteriorated upon impregnation. On the other hand, when the weight average molecular weight of the polymer exceeds 500,000 g/mol, the production process may not smoothly proceed and porosity may be deteriorated.

The porous support has a structure in which nanofibers are integrated in the form of a non-woven fabric including a plurality of pores and the porous support is preferably an assembly of polymer nanofibers in which the nanofibers produced by electrospinning are three-dimensionally irregularly and discontinuously arranged.

Specifically, the nanofibers preferably have a mean diameter of 0.01 μm to 5 μm, in consideration of porosity and thickness of the porous support, wherein the mean diameter is obtained by measuring diameters of 50 nanofibers with a scanning electron microscope (JSM6700F, JEOL) and calculating an average of the 50 values. When the mean diameter of the nanofibers is lower than 0.01 μm, mechanical strength of the porous support may be deteriorated and when the mean diameter of the nanofibers exceeds 5 μm, porosity may be decreased and thickness may be increased.

In addition, the porous support may include a plurality of uniformly distributed pores because it is formed by arbitrarily arranging the nanofibers having the diameter described above. The porous support including uniformly distributed pores has excellent porosity and properties (such as dimensional stability) capable of enhancing physical properties of ion conductors. Specifically, the diameter of pores formed in the porous support may be within the range of 0.05 to 30 μm. When the pore diameter is less than 0.05 μm, the ion conductivity of the polymer electrolyte membrane may be deteriorated and when the pore diameter exceeds 30 μm, mechanical strength of the polymer electrolyte membrane may be deteriorated.

In addition, porosity that indicates a level of pores formed in the porous support may be 80 to 95%. As porosity of the porous support increases, a specific surface area of the porous support increases. For this reason, it is easy to fill the polymer in the pores and, as a result, superior ion conductivity can be obtained. When the porosity of the porous support is less 80%, it is difficult to obtain sufficient ion conductivity, and when the porosity of the porous support exceeds 95%, mechanical strength and shape stability may be deteriorated.

The porosity (%) may be calculated as a ratio of an air volume with respect to a total volume of the porous support as depicted by the following Equation 1.

Porosity (%)=(air volume/total volume)×100        [Equation 1]

The total volume is calculated by producing a rectangular porous support sample and measuring width, length and thickness of the sample and the air volume of the porous support is obtained by measuring a weight of the sample and subtracting a polymer volume, calculated back from polymer density, from the total volume.

In addition, the porous support may have a mean thickness of 5 to 40 μm. When the thickness of the porous support is smaller than 5 μm, mechanical strength and dimensional stability of the polymer electrolyte membrane may be deteriorated and, on the other hand, when the thickness exceeds 40 μm, resistance loss may increase and weight reduction and integration may be deteriorated. More preferably, the porous support may have a mean thickness of 10 to 30 μm.

The polymer may be present in an amount of 50 to 99% by weight with respect to the total weight of the polymer electrolyte membrane. When the content of the polymer is less than 50% by weight, the ion conductivity of the polymer electrolyte membrane may be deteriorated, and when the content of the polymer exceeds 99% by weight, mechanical strength and dimensional stability of the polymer electrolyte membrane may be deteriorated.

In addition, the polymer electrolyte membrane exhibits high ion conductivity and excellent mechanical strength, and specifically excellent mechanical strength of 10 MPa or more because the polymer is uniformly and densely filled in the highly porous support. As ion conductivity and mechanical strength are improved, the total thickness of the polymer electrolyte membrane can be decreased and, more specifically, to 80 μm or less. As a result, raw material costs are reduced, ion conduction speed is increased and ohmic loss is decreased.

In addition, the polymer electrolyte membrane includes a hydrophobic porous support, thereby exhibiting excellent dimensional stability. Specifically, the polymer electrolyte membrane exhibits superior dimensional stability when swollen in water, of 8% or less, preferably, of 1% or less. The dimensional stability is a physical property evaluated in accordance with the following Equation 2 using a length variation before and after swelling of the reinforced composite membrane in water.

Dimensional stability=[(length after swelling−length before swelling)/length before swelling]×100        [Equation 2]

The polymer electrolyte membrane including pores of the porous support filled with the polymer can be produced by a first step of electrospinning with an electrospinning solution to produce a porous support in which nanofibers are integrated in a non-woven fabric including a plurality of pores and a second step of filling pores of the porous support with the polymer.

Hereinafter, the respective steps will be described in detail. The electrospinning solution includes monomers for forming the nanofibers and the monomers for forming the nanofibers are preferably a hydrocarbon-based polymer which exhibits superior chemical resistance and hydrophobicity, and is thus free from shape deformation by moisture under high humidity environments.

Specifically, the hydrocarbon-based polymer may be selected from the group consisting of nylon, polyimide, polyaramide, polyether imide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, copolymers thereof and mixtures thereof. Of these, polyimide which exhibits relatively better heat resistance, chemical resistance and shape stability is preferably used.

Hereinafter, a case in which the nanofiber includes polyimide as a hydrophobic polymer will be described in detail.

In the case in which the nanofiber includes polyimide as a hydrophobic polymer, a method of producing the porous support includes adding diamine and dianhydride to a solvent to prepare an electrospinning solution, electrospinning the prepared electrospinning solution to produce a polyamic acid nanoweb in which nanofibers are integrated in a non-woven fabric including a plurality of pores, and imidizing the polyamic acid nanoweb to produce a polyimide nanoweb.

The dianhydride may include a compound selected from the group consisting of pyromellitic dianhydride (PMDA), 3,3',4,4'-benzophenonetetracarboxylic dianhydride (BTDA), 4,4'-oxydiphthalic anhydride (ODPA), 3,4,3',4'-biphenyltetracarboxylic dianhydride (BPDA), bis(3,4-dicarboxyphenyl)dimethylsilane dianhydride (SiDA) and mixtures thereof.

In addition, the diamine may be selected from the group consisting of 4,4'-oxydianiline (ODA), 1,3-bis(4-aminophenoxy)benzene (RODA), p-phenylene diamine (p-PDA), o-phenylene diamine (o-PDA) and a mixture thereof.

The solvent may be selected from the group consisting of m-cresol, N-methyl-2-pyrrolidone (NMP), dimethylformamide (DMF), dimethylacetamide (DMAc), dimethylsulfoxide (DMSO), acetone, diethyl acetate, tetrahydrofuran (THF), chloroform, γ-butyrolactone and mixtures thereof.

The monomers for forming the nanofibers may be present in an amount of 5 to 20% by weight, with respect to the total weight of the electrospinning solution. When the content of the monomers is less than 5% by weight, fibers are not formed or fibers with a uniform diameter are not produced because spinning may not proceed well and, when the content of the monomers exceeds 20% by weight, spinning may not be performed or process efficiency may be deteriorated due to rapidly increased discharge pressure.

Next, the spinning solution is spun to produce a nanoweb precursor, that is, a polyamic acid nanoweb. There is no particular limitation as to spinning in the present invention, and the spinning is electrospinning, electro-blown spinning, centrifugal spinning or melt blowing or the like, preferably, electrospinning.

Hereinafter, an example of using electrospinning will be described in detail.

Figure 1:
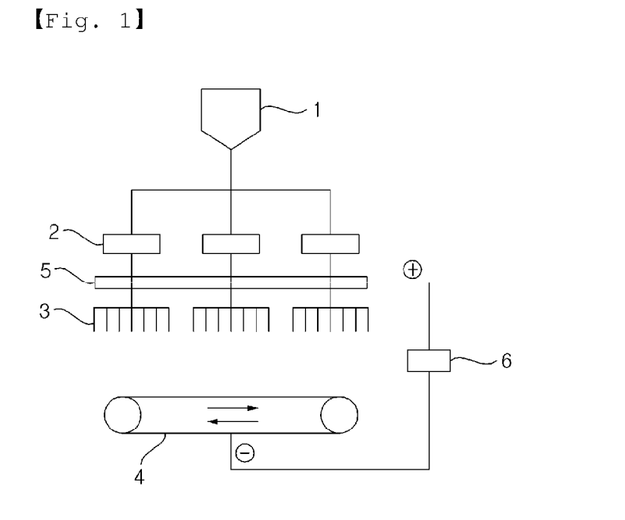
FIG. 1 is a schematic view illustrating a nozzle-type electrospinning device.

FIG. 1 is a schematic view illustrating a nozzle-type electrospinning device. Referring to FIG. 1, in accordance with electrospinning, a predetermined amount of the spinning solution is supplied from a solution tank 1 storing the spinning solution to a nozzle 3 using a volumetric pump 2 and a high voltage generated by a high-voltage generator 6 is applied to the nozzle 3 and at the same time, the nanofiber precursor solution is ejected through the nozzle 3 to form nanofiber precursors which are scattered and, at the same time, coagulated. Additionally, the coagulated nanofiber precursors are collected on the collector 4 to produce a precursor nanofiber of the porous support.

In this case, an intensity of electric field between the nozzle 3 and the collector 4 applied by the high-voltage generator 6 and the voltage transfer rod 5 is preferably 850 to 3,500 V/cm. When the intensity of the electric field is less than 850 V/cm, uniform thickness of nanofibers cannot be produced because the spinning solution is not continuously ejected, and production of the nanoweb may be difficult because the nanofibers formed after spinning cannot be smoothly collected on the collector and, when the intensity of electric field exceeds 3,500 V/cm, the nanofibers are not mounted at a desired position on the collector 4, thus making acquisition of a nanoweb having a normal shape impossible.

Nanofibers having a uniform fiber diameter, preferably a mean diameter of 0.01 to 5 μm are produced by the spinning process, and the nanofibers are arranged in a predetermined direction or randomly to form a non-woven fabric.

Finally, the nanofiber precursor of the nanoweb precursor may be cured to produce a porous support. In order to convert the nanofiber precursor into the nanofiber, the nanofiber precursor is subjected to an additional process, i.e., curing. For example, when the nanofiber precursor produced by electrospinning includes polyamic acid, the nanofiber precursor is converted into polyimide by imidization during curing.

Accordingly, the temperature of the curing process can be suitably controlled in consideration of conversion ratio of the nanofiber precursor. Specifically, the curing process may be conducted at 80 to 650° C. When the curing temperature is lower than 80° C., conversion ratio is decreased and, as a result, the heat resistance and chemical resistance of the nanoweb may be deteriorated and, when the curing temperature exceeds 650° C., physical properties of the nanoweb may be deteriorated by degradation of the nanofibers.

The second step is filling the pores of the porous support produced in the first step with the polymer.

The filling with the polymer may be carried out by immersing the porous support in a solution prepared by dissolving the polymer in a solvent, or applying the ion conductor solution onto the porous support using a variety of methods well known in the art, such as spraying, screen-printing and doctor blade. The immersion is preferably carried out 2 to 5 times at room temperature (20 to 25° C.) for 5 to 30 minutes.

The ion conductor solution may be prepared by dissolving the polymer in an organic solvent. In this case, examples of the organic solvent include, but are not limited to, N-methyl-2-pyrrolidinone (NMP), dimethylformamide (DMF), and dimethyl acetamide (DMA).

The content of the polymer in the ion conductor solution may be suitably determined in consideration of the content of the polymer in the polymer electrolyte membrane. Specifically, the polymer may be present in an amount of 5 to 40% by weight in the ion conductor solution. When the polymer is present in an amount of less than 5% by weight with respect to the total weight of the ion conductor solution, the polymer does not sufficiently fill pores of the porous support and an empty area is thus formed, and when the polymer exceeds 40% by weight, the polymer does not easily fill pores of the porous support due to excessively high viscosity of the ion conductor solution.

After filling with the ion conductor solution, the organic solvent present in the ion conductor solution is removed so that the polymer can be filled in pores of the porous support. Accordingly, the method of producing the polymer electrolyte membrane may further include removing the organic solvent after filling with the polymer and the removing the organic solvent may include drying at 60 to 150° C. in a vacuum oven for 2 to 15 hours.

In another aspect, the present invention is directed to a membrane-electrode assembly for fuel cells including the polymer electrolyte membrane and a fuel cell.

Specifically, the membrane-electrode assembly includes an anode and a cathode which face each other, and the polymer electrolyte membrane disposed between the anode and the cathode.

Figure 2:
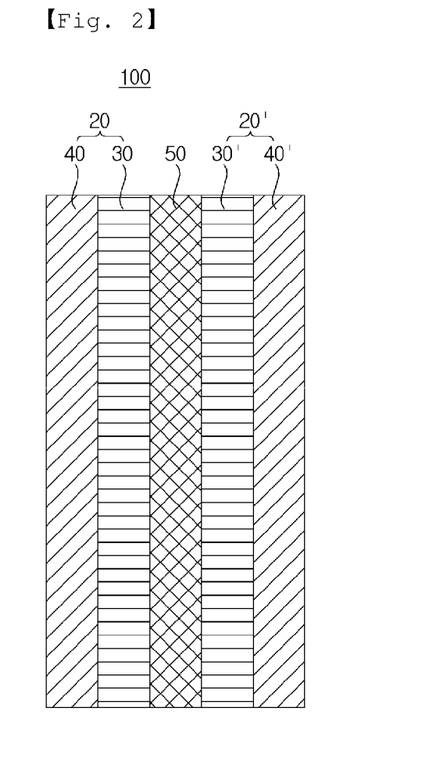
FIG. 2 is a schematic sectional view illustrating a membrane-electrode assembly according to an embodiment of the present invention.

FIG. 2 is a sectional view schematically illustrating a membrane-electrode assembly according to an embodiment of the present invention. Referring to FIG. 2, the membrane-electrode assembly 100 according to the present embodiment includes a polymer electrolyte membrane 50 and electrodes 20 and 20' for fuel cells disposed respectively on both surfaces of the polymer electrolyte membrane 50. The electrodes 20 and 20' include electrode substrates 40 and 40' and catalyst layers 30 and 30' formed on surfaces of the electrode substrate, respectively, and may further include a microporous layer (not shown) containing fine conductive particles such as carbon powder or carbon black to facilitate substance diffusion between the electrode substrates 40 and 40' and the catalyst layers 30 and 30'.

In the membrane-electrode assembly 100, the electrode which is disposed on one surface of the polymer electrolyte membrane 50 and produces hydrogen ions and electrons from a fuel which is transported via the electrode substrate 40 to the catalyst layer 30 is referred to as an anode and the electrode 20' which is disposed on the other surface of the polymer electrolyte membrane 50 and induces a reduction reaction to produce water from hydrogen ions supplied through the polymer electrolyte membrane 50 and an oxidizing agent transporting via the electrode substrate 40' to the catalyst layer 30' is referred to as a cathode.

The catalyst layers 30 and 30' of the anode and cathode 20 and 20' include a catalyst. Any catalyst may be used so long as it participates in reactions of fuel cells and is commonly used as a catalyst for fuel cells. Specifically, the catalyst may be a platinum-based catalyst and examples of the platinum-based catalyst include platinum, ruthenium, osmium, platinum-ruthenium alloys, platinum-osmium alloys, platinum-palladium alloys and platinum-M alloys (wherein M represents at least one transition metal selected from the group consisting of Ga, Ti, V, Cr, Mn, Fe, Co, Ni, Cu, Zn, Sn, Mo, W and Rh). More specifically, the platinum-based catalyst may include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni and Pt/Ru/Sn/W. The catalyst may be used as a catalyst (black) alone, or may be supported on a support medium upon use. Examples of the support medium include carbon-based substances such as graphite, Denka black, Ketjen black, acetylene black, carbon nanotubes, carbon nanofibers, carbon nanowires, carbon nanoballs and activated carbon, and inorganic particulates such as alumina, silica, zirconia and titania particulates.

In addition, the catalyst layers 30 and 30' may further include a binder resin to improve adhesion between the catalyst layer and the polymer electrolyte membrane, and transfer hydrogen ions. The binder resin may be the same as the ionic conductor used for production of the polymer electrolyte membrane.

The electrode substrates 40 and 40' may be porous conductive substrates to facilitate supply of hydrogen or oxygen. Representative examples of the porous conductive substrates include carbon paper, carbon cloth, carbon felt and metal cloth (a porous film composed of fibrous metal cloth or a metal film formed on the surface of cloth made of polymer fibers), but the present invention is not limited thereto. In addition, preferably, the electrode substrate may be subjected to waterproofing with a fluorine-based resin so as to prevent deterioration in diffusion efficiency of reactants by water generated during operation of fuel cells. Examples of the fluorine-based resin include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene and copolymers thereof.

The membrane-electrode assembly 100 may be produced by an ordinary method of producing a membrane-electrode assembly for fuel cells except that the polymer electrolyte membrane according to the present invention is used as the polymer electrolyte membrane 50.

In another aspect, the present invention is directed to a fuel cell including the membrane-electrode assembly 100.

Specifically, the fuel cell includes at least one electricity generator for generating electricity through oxidization reaction of a fuel and reduction reaction of an oxidizing agent, a fuel supply for supplying the fuel to the electricity generator, and an oxidizing agent supply for supplying the oxidizing agent such as oxygen or air to the electricity generator, wherein the electricity generator includes the membrane-electrode assembly 100 and a separator for supplying the fuel and the oxidizing agent to both sides of the membrane-electrode assembly 100. The fuel used herein may be a gas or liquid hydrogen and/or hydrocarbon fuel and representative examples of the hydrocarbon fuel include methanol, ethanol, propanol, butanol and natural gas.

The separator, the fuel supply and the oxidizing agent supply are those used for general fuel cells, except that the membrane-electrode assembly 10 according to the embodiment of the present invention is used for the fuel cell and a detailed description thereof will thus be omitted.

DESCRIPTION OF REFERENCE NUMERALS

1: Solution tank
2: Volumetric pump
3: Nozzle
4: Collector
5: Voltage transfer rod
6: High-voltage generator
20,20': Electrodes
30,30': Catalyst layers
40,40': Electrode substrates
50: Polymer electrolyte membrane
100: Membrane-electrode assembly

MODE FOR INVENTION

Hereinafter, embodiments will be described in detail so that the embodiments can be easily implemented by a person who has ordinary knowledge in the field to which the present invention pertains. The present invention may be embodied in many different forms and should not be construed as limited to the embodiments set forth herein.

Preparation Example 1: Preparation of Polymer

Comparative Example 1-1

After a 4-neck round flask and a Dean-stark trap were installed, 4,4'-biphenol (BP, in an amount of 100 parts by mole with respect to 50 parts by mole of SDCDPS described below) and $K_2CO_3$ were added to NMP and toluene, and the resulting mixture was stirred in a mechanical stirrer and the temperature was slowly elevated to 150° C. for about two hours. The reaction solution was refluxed in toluene through the dean-stark trap for about 4 hours at the temperature of 150° C. and toluene was then removed. The dried 3,3'-disulfonated-4,4'-dichlorodiphenyl sulfone (SDCDS) and 4,4'-dichlorodiphenyl sulfone (DCDPS) were weighed in a molar ratio of 50:50 in a glove box and then added together with NMP to a reactor. After the temperature was slowly elevated to 195° C., stirring was conducted for 16 hours. After completion of polymerization, the resulting product was precipitated in water to remove the salt at 100° C. for 2 hours, followed by filtering. The resulting filtrate was dried to obtain the polymer.

Example 1-1

After a 4-neck round flask and a dean-stark trap were installed, dihydroxy bipyridine (in an amount of 100 parts by mole with respect to 50 parts by mole of SDCDS described below) and $K_2CO_3$ were added to N-methyl-2-pyrrolidone (NMP) and toluene, and the resulting mixture was stirred in a mechanical stirrer and the temperature was slowly elevated to 150° C. for about two hours. The reaction solution was refluxed in toluene through the dean-stark trap for about 4 hours at the temperature of 150° C. and toluene was then removed. The dried SDCDS and DCDPS were weighed in a molar ratio of 50:50 in a glove box and then added together with NMP to a reactor. After the temperature was slowly elevated to 195° C., stirring was conducted for 16 hours. After completion of polymerization, the resulting product was precipitated in water to remove the salt at 100° C. for 2 hours, followed by filtering. The resulting filtrate was dried to obtain the polymer.

Preparation Example 2: Preparation of Polymer Electrolyte Membrane

Comparative Example 2-1

The polymer prepared in Comparative Example 1-1 was dissolved in DMAc at 20% by weight and a film was then formed to produce a single membrane type-polymer electrolyte membrane.

Example 2-1

A polymer electrolyte membrane was produced in the same manner as in Comparative Example 2-1, except that the polymer prepared in Example 1-1 was used, instead of the polymer prepared in Comparative Example 1-1.

Comparative Example 2-2

Polyamic acid was dissolved in dimethylformamide to prepare 5 L of a spinning solution having a viscosity of 480 poise. The prepared spinning solution was transferred to a solution tank, fed by a volumetric gear pump to a spinning chamber which has 20 nozzles and to which a high voltage of kV was applied and then spun to produce a web for a nanofiber precursor. At this time, the amount of the supplied solution was 1.0 ml/min and the web for a nanofiber precursor was thermally treated at 350° C. to produce a porous support (porosity: 40% by volume).

The produced porous support was impregnated in an ion conductor solution prepared by dissolving the polymer prepared in Comparative Example 1-1 in DMAc at 20% by weight twice for 30 minutes, was allowed to stand under a reduced pressure for one hour and dried under vacuum at 80° C. for 10 hours to produce a polymer electrolyte membrane. In this case, a weight per unit area of polyimide nanofibers was 6.8 gsm and the weight of the polymer was 65 mg/cm$^2$.

Example 2-2

A polymer electrolyte membrane was produced in the same manner as in Comparative Example 2-2, except that the polymer prepared in Example 1-1 was used, instead of the polymer prepared in Comparative Example 1-1.

Example 1: Measurement of NMR Data of Produced Polymer Electrolyte Membrane 1 to 10% by weight of solution of each of the polymers prepared in Comparative Example 1-1 and Example 1-1 in a DMAc solvent was prepared and NMR analysis was conducted using the obtained solution. As a result, all of polymers prepared in Comparative Example 1-1 and Example 1-1 exhibited a proton peak of a phenyl group at 7.1 ppm, 7.65 ppm, and 7.9 ppm. In particular, the polymer prepared in Example 1-1 further exhibited a peak at 8.2 ppm and 8.5 ppm, as compared to the polymer prepared in Comparative Example 1-1, and exhibited a peak overlapping a proton of a phenyl group at 7.0 ppm to 7.3 ppm. That is, the polymer prepared in Example 1-1 further exhibited a peak at 8.0 to 8.7 ppm and this peak indicates presence of proton of a pyridine group.

Example 2: Evaluation of Performance of Produced Polymer Electrolyte Membrane Physical properties of the polymer electrolyte membranes produced in Comparative Examples 2-1 to 2-2 and Examples 2-1 to 2-2 were evaluated. The physical properties were measured by monitoring the state of the polymer electrolyte membranes prepared in a size of 3×3 cm$^2$ after adding 2 ppm of $FeSO_4$ to 3% by weight of a $H_2O_2$ aqueous solution, while maintaining the membranes at 80° C. When observed by the naked eye, a time at which opening or breakage occurred was recorded as a primary degradation time and a time at which the membrane was completely melted was recorded as a complete degradation time. In addition, ion conductivity was measured under conditions of 80° C. and a relative humidity of 95% and under conditions of 80° C. and a relative humidity of 50%. Results are shown in Table 1 below.

TABLE 1

| | Comparative Example 2-1 | Comparative Example 2-2 | Example 2-1 | Example 2-2 |
|---|---|---|---|---|
| Primary degradation time | 8 hrs | 24 hrs | 36 hrs | 40 hrs |
| Complete degradation time | 25 hrs | 100 hrs | Exceeding 100 hrs | Exceeding 100 hrs |
| Ion conductivity (80° C., 95 RH %) | 0.12 S/cm | 0.12 S/cm | 0.12 S/cm | 0.12 S/cm |
| ion conductivity (80° C., 50 RH %) | 0.04 S/cm | 0.04 S/cm | 0.08 S/cm | 0.08 S/cm |

As can be seen from Table 1, the polymer electrolyte membrane produced in Example exhibited improved resistance to radical attacks and thus remarkably enhanced degradation time, as compared to the polymer electrolyte membrane produced in Comparative Example.

In addition, the polymer electrolyte membrane produced in Example can maximize functions of an ionic conductive group and thus enhance fuel cell operation functions under low-humidity conditions based on improved acid-base interaction, as compared to the polymer electrolyte membrane produced in Comparative Example.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The polymer electrolyte membrane according to the present invention can be applied to a membrane-electrode assembly and a fuel cell.

The polymer electrolyte membrane can prevent a phenomenon in which an addition reaction occurs on an aromatic ring of the polymer electrolyte membrane or the aromatic ring is broken by attack from radicals formed on a cathode during operation of a fuel cell, based on improved resistance to radical attacks, and can maximize functions of an ionic conductive group and thus enhance fuel cell operation functions under low-humidity conditions based on improved acid-base interaction.

The invention claimed is:

1. A polymer electrolyte membrane comprising a polymer including repeat units represented by Formulae 1 to 3 below:

[Formula 1]

[Formula 2]

[Formula 3]

wherein A is an ion conducting group selected from the group consisting of a sulfonic acid group, a carboxylic acid group and a phosphoric acid group;

X is any one selected from the group consisting of a single bond, —CO—, —SO$_2$—, —CONH—, —COO—, —CR'$_2$—, a cyclohexylidene group, a fluorenylidene group, —O— and —S— in which R' is any one selected from the group consisting of a hydrogen atom, a halogen atom, an alkyl group, a halogenated alkyl group, an allyl group, an aryl group, a nitro group and a nitrile group;

Y is a bivalent nitrogen-containing aromatic ring;

Z is —O— or —S—;

$R_1$ to $R_{14}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group; and n is an integer of 0 to 4.

2. The polymer electrolyte membrane according to claim 1, wherein the polymer comprises 100 parts by mole of the repeat unit represented by Formula 3, 1 to 200 parts by mole of the repeat unit represented by Formula 1 and 1 to 200 parts by mole of the repeat unit represented by Formula 2.

3. The polymer electrolyte membrane according to claim 1, wherein the bivalent nitrogen-containing aromatic ring comprises any one selected from the group consisting of pyrrole, thiazole, isothiazole, oxazole, iso-oxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

4. The polymer electrolyte membrane according to claim 1, wherein the polymer further comprises a repeat unit represented by Formula 4 below:

[Formula 4]

wherein Z is —O— or —S—; and

$R_{15}$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

5. The polymer electrolyte membrane according to claim 4, wherein the polymer comprises 100 parts by moles of the repeat unit represented by Formula 3, 1 to 200 parts by mole of the repeat unit represented by Formula 1, 1 to 200 parts by mole of the repeat unit represented by Formula 2, and 1 to 200 parts by mole of the repeat unit represented by Formula 4.

6. The polymer electrolyte membrane according to claim 1, wherein the polymer further comprises repeat units represented by Formulae 5 and 6 below:

[Formula 5]

[Formula 6]

wherein A is an ion conducting group selected from the group consisting of a sulfonic acid group, a carboxylic acid group and a phosphoric acid group;

Y is a bivalent nitrogen-containing aromatic ring;

Z is —O— or —S—; and $R_1$ to $R_6$ and $R_{15}$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group.

7. The polymer electrolyte membrane according to claim 6, wherein the polymer further comprises repeat units represented by Formulae 7 and 8 below:

[Formula 7]

[Formula 8]

wherein A is an ion conducting group selected from the group consisting of a sulfonic acid group, a carboxylic acid group and a phosphoric acid group;

X is any one selected from the group consisting of a single bond, —CO—, —SO$_2$—, —CONH—, —COO—, —CR'$_2$—, a cyclohexylidene group, a fluorenylidene group, —O— and —S— in which R' is any one selected from the group consisting of a hydrogen atom, a halogen atom, an alkyl group, a halogenated alkyl group, an allyl group, an aryl group, a nitro group and a nitrile group;

Z is —O— or —S—;

$R_1$ to $R_{22}$ are each independently any one selected from the group consisting of a sulfonic acid group, a carboxylic acid group, a phosphoric acid group, a hydrogen atom, a halogen atom, an alkyl group, a halogenated alkyl group, an allyl group, an aryl group, a nitro group and a nitrile group; and n is an integer of 0 to 4.

8. The polymer electrolyte membrane according to claim 1, wherein the polymer electrolyte membrane comprises:
a porous support comprising nanofibers integrated in the form of a non-woven fabric including a plurality of pores; and
the polymer filling pores of the porous support.

9. A membrane-electrode assembly comprising:
an anode and a cathode which face each other; and
the polymer electrolyte membrane according to claim 1 disposed between the anode and the cathode.

10. A fuel cell comprising the membrane-electrode assembly according to claim 9.

11. A membrane-electrode assembly comprising:
an anode and a cathode which face each other; and
the polymer electrolyte membrane according to claim 8 disposed between the anode and the cathode.

12. A fuel cell comprising the membrane-electrode assembly according to claim 11.

* * * * *